May 9, 1967 J. J. BOWDEN 3,318,687
TREATMENT OF SLAG IN THE PROCESS OF MAKING STEEL
Filed April 30, 1964 2 Sheets-Sheet 1
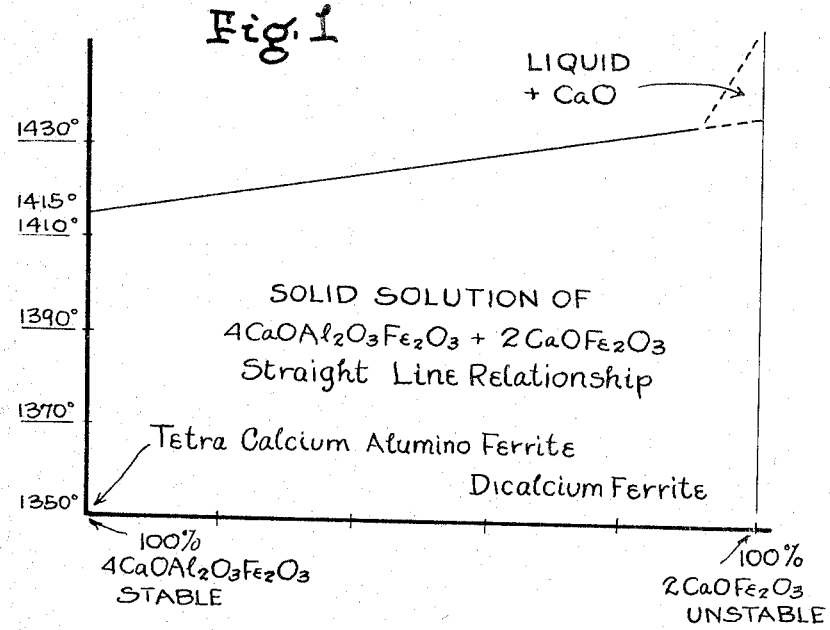
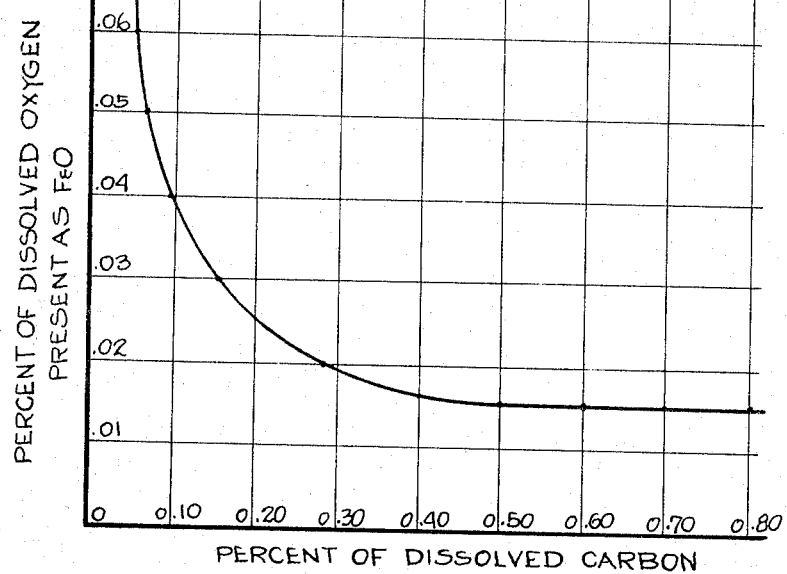
INVENTOR.
JAMES J. BOWDEN
BY
*Williams and Kreske*
ATTORNEYS

Fig. 2.

| % $Al_2O_3$ | % $C_4AF$ | Complementary Minerals $4CaO\,Al_2O_3\,Fe_2O_3$ Molecular Weights | | | % $2CF$ | $2CaO\,Fe_2O_3$ Mole. Weights | | Total | | F/A Ratio |
|---|---|---|---|---|---|---|---|---|---|---|
| | | 224 $4CaO$ | 102 $Al_2O_3$ | 160 $Fe_2O_3$ | | 112 $2CaO$ | 160 $Fe_2O_3$ | $Al_2O_3$ | $Fe_2O_3$ | |
| .01 | .50 | 1.12 | 0.5 | 0.8 | 99.5 | 114.44 | 159.2 | 0.5 | 160.0 | 320.0 |
| .03 | 1.50 | 3.36 | 1.5 | 2.4 | 98.5 | 110.32 | 157.6 | 1.5 | 160.0 | 106.7 |
| .05 | 2.50 | 5.6 | 2.5 | 4.0 | 97.5 | 108.20 | 156.0 | 2.5 | 160.0 | 64.0 |
| .1 | 5.00 | 11.2 | 5.6 | 8.0 | 95.0 | 106.4 | 152.0 | 5.6 | 160.0 | 28.5 |
| .2 | 10.00 | 22.4 | 10.2 | 16.0 | 90.0 | 100.8 | 144.0 | 10.2 | 160.0 | 15.68 |
| .4 | 20.00 | 44.8 | 20.4 | 32.0 | 80.0 | 89.6 | 128.0 | 20.4 | 160.0 | 7.84 |
| .6 | 30.00 | 67.2 | 30.6 | 48.0 | 70.0 | 78.4 | 112.0 | 30.6 | 160.0 | 5.22 |
| .8 | 40.00 | 89.6 | 40.8 | 64.0 | 60.0 | 67.2 | 96.0 | 40.8 | 160.0 | 3.92 |
| 1.0 | 50.00 | 112.0 | 51.0 | 80.0 | 50.0 | 56.0 | 80.0 | 51.0 | 160.0 | 3.13 |
| 1.2 | 60.00 | 134.4 | 61.2 | 96.0 | 40.0 | 44.8 | 64.0 | 61.2 | 160.0 | 2.61 |
| 1.4 | 70.00 | 156.8 | 71.4 | 112.0 | 30.0 | 33.6 | 48.0 | 71.4 | 160.0 | 2.24 |
| 1.6 | 80.0 | 179.2 | 81.6 | 128.0 | 20.0 | 22.4 | 32.0 | 81.6 | 160.0 | 1.96 |
| 1.8 | 90.0 | 211.6 | 91.8 | 144.0 | 10.0 | 11.2 | 16.0 | 91.8 | 160.0 | 1.74 |
| 2.0 | 100.00 | 224.0 | 102.0 | 160.0 | 0.0 | 0.0 | 0.0 | 102.0 | 160.0 | 1.57 |
| 2.2 | 110.00 | 246.4 | 112.2 | 160.0 | $C_4AF + 2CF = 100\%$ solid solubility since $Al_2O_3$ combines with $Fe_2O_3$ there will be no $2CF$ if an excess of $Al_2O_3$ theoretically is present | | | | | 1.42 |
| 2.4 | 120.00 | 268.8 | 122.4 | 160 | | | | | | 1.30 |
| 2.6 | 130.00 | 291.2 | 132.6 | 160 | | | | | | 1.20 |
| 2.8 | 140.00 | 313.6 | 142.8 | 160 | | | | | | 1.12 |
| 3.0 | 150.00 | 336.0 | 153.0 | 160 | | | | | | 1.04 |
| 3.2 | 160.00 | 358.4 | 163.2 | 160 | | | | | | .98 |

INVENTOR.
JAMES J. BOWDEN
BY
Williams and Kreske
ATTORNEYS

3,318,687
TREATMENT OF SLAG IN THE PROCESS OF MAKING STEEL
James J. Bowden, P.O. Box 127, Cortland, Ohio 44410
Filed Apr. 30, 1964, Ser. No. 363,781
2 Claims. (Cl. 75—53)

My invention relates to the treatment of slag in the process of making steel, and the principal object of my invention is to produce better steel at a reduced cost.

My invention is particularly adaptable in the manufacture of low carbon steel and the ensuing description will be directed mainly to this type of steel. Reference should be made to the accompanying drawing wherein FIGURES 1, 2 and 3 illustrate charts and tables for a better understanding of the present invention.

It is common practice to produce steel for use in the automotive or electrical industry by ordinary steel making processes wherein the carbon content is very low, such as 0.02 to 0.06% carbon. In the ordinary process, the molten metal is poured from the furnace into a ladle and is "killed" by the addition of either aluminum or silicon. For use in the fabrication of auto parts which require deep drawing, aluminum is used to "kill" the steel, whereas for use in the fabrication of motor and transformer laminations, silicon is used to "kill" the steel. The term "kill" is used to indicate that the molten steel has been treated (either with aluminum or silicon) to reduce as well as is practical the ferrous oxide content thereof.

It is well known to those skilled in the art of steel manufacture by the open hearth and electric furnace processes that in a standard method of operation the furnace is charged with limestone and/or lime, steel scrap and pig iron, in that sequence. The metallic charge is then melted by the heat of an extraneous fuel, such as oil, gas or electricity.

In the case of the basic oxygen process (LD Process) which is now finding appeal with the steel makers, the sequence of charging is to add steel scrap equal to approximately 25% of the charged weight, which is followed by a slag forming material made up of lime and/or limestone with mill scale or iron ore and either fluorspar and/or aluminum oxide, and the remainder of the metallic charge then added as approximately 75% by weight, of molten pig iron.

In the basic oxygen process, pure oxygen is blown on the surface of the molten mixture, causing the oxidation of the silicon, manganese and carbon, with the blowing continued until the carbon in the steel bath is down to a desired end point, such as 0.02 to 0.06% as above mentioned.

In the manufacture of steel using either of the aforesaid processes, a final or tapping slag is formed from a lime base which roughly has a composition as follows:

$SiO_2$, 8.00 to 12.00%      $Fe_2O_3$, 4.00 to 8.00%
CaO, 32.00 to 45.00          FeO, 23.00 to 40.00%
MgO, 4.50 to 8.00%           MnO, 3.50 to 5.50%
$Al_2O_3$, 0.30 to 3.50%

The initial constituents of this slag in the open hearth process are normally iron and manganese silicates, but later in the process when sufficient lime comes into the slag, the principal constituents are dicalcium silicate, tetra calcium alumino ferrite, dicalcium ferrite, calcium phosphate, and finally free lime, the constituents being formed in that sequence.

In patent Re. 23,778, issused to me on February 9, 1954, column 1, lines 40 et seq., is shown a table of incidence and disposition of lime in the normal order of mineral formation in an open hearth furnace, and for convenience that table is reproduced below.

Mineral formula: | Name of mineral
---|---
(1) $FeOMnOSiO_2$ | Knebelite, some MgO present at all times.
(2) $2CaOSiO_2$ | Dicalcium silicate.
(3) $4CaOFe_2O_3Al_2O_3$ | Tetra calcium alumino ferrite.
(4) $2CaOFe_2O_3$ | Dicalcium ferrite.
(5) $3CaOP_2O_5$ | Tricalcium phosphate.
(6) CaO | Free lime, present at all times; not formed but is result of calcination of the charged limestone or lime.

The above minerals, through a constantly changing state of oxidation, normally increase the concentration of the iron oxide ($Fe_2O_3$) phase and simultaneously decrease the concentration of the free lime (CaO) in the slag.

In the table of incidence shown above the ferric oxide ($Fe_2O_3$) is preferentially present in the slag as

$$4CaOAl_2O_3Fe_2O_3$$

to the extent that all of the $Al_2O_3$ is present in the slag as ($4CaOAl_2O_3Fe_2O_3$) which is a very stable mineral that holds the ferric oxide in a nonreactive state in the slag. At the same time, the tetra calcium alumino ferrite is acting to flux the lime (CaO) which is present in the slag, but as soon as all the alumina ($Al_2O_3$) present in the slag has combined with the lime to form tetra calcium alumino ferrite, the next mineral in the order of incidence (see above table) is dicalcium ferrite

$$(2CaOFe_2O_3)$$

As shown in FIGURE 1 of the drawing, it is seen that tetra calcium alumino ferrite and dicalcium ferrite have solid solubility in each other in all proportions from 0 to 100% and generally speaking, an increase in the percentage of alumina ($Al_2O_3$) moves the curve shown in FIGURE 1 to the left to an increase in the percentage of tetra calcium alumino ferrite. In the complementary mixtures of

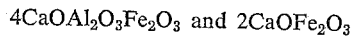
$$4CaOAl_2O_3Fe_2O_3 \text{ and } 2CaOFe_2O_3$$

the concentration of ferric oxide remains molecularly constant and therefore as the percentage of alumina ($Al_2O_3$) is increased, the percentage of tetra calcium alumino ferrite is increased until finally all of the ferric oxide in solid solution is present as tetra calcium alumino ferrite and none is present to combine with the lime to form dicalcium ferrite. Therefore, in order to convert all of the dicalcium ferrite to tetra calcium alumino ferrite, it is only necessary to increase the concentration of alumina in this mixture.

However, care must be taken as to the amount and time of the addition of alumina. In Patent 2,283,622, issued May 19, 1942, to me and John S. Suda, alumina is added in the place of fluorspar during the making of the steel, since it was found that this speeded up the process of steel making. However, if an excess of alumina in this patented process is added during the time the steel is being made in the furnace, the process of oxidation is slowed down or practically halted. I have discovered, as an improvement to said patented process, that if an excess of alumina is added to the slag the process is reversed thereby changing the dicalcium ferrite to tetra calcium alumino ferrite. The time lost in this improved process is economically more than made up by the improvement in the quality of the steel.

Dicalcium ferrite is an unstable mineral and in the presence of iron, which is always present in the bath, the following reaction takes place:

$$2CaOFe_2O_3 + Fe \rightarrow 2CaO + 3FeO$$

It is generally known that FeO is not only soluble in the slag but is also soluble in the underlying metal (steel) and because of this interchangeability of solubility there is a constant effort to reach equilibrium in the consentration of FeO in both the slag and the metal, and this also conforms to the percentage of carbon present in the metal, since as shown in FIGURE 3, the percentage of oxygen in the bath will depend on the carbon content of the metal.

Therefore, as shown in FIGURE 3, as the percentage of carbon in the steel decreases, the percentage of oxygen (present as FeO) increases. Again referring to FIGURE 3, a steel which contains only 0.02% to 0.06% carbon, when tapped, contains a relatively high percentage of oxygen, at times as much as 0.09% oxygen which is present in the steel as FeO.

Since the carbon in the steel bath is present as iron carbide ($Fe_3C$) the steel making process from the beginning depends upon the oxidation of the carbon present in the charge by means of the reaction:

$$Fe_3C + FeO \rightarrow 4Fe + CO$$

In this manner, the carbon content of the bath is reduced by converting the carbon to carbon monoxide (CO) and allowing this gas to escape to the atmosphere by bubbling up through the slag.

Because of its high oxygen (FeO) content, the steel thus formed is not suitable for the auto or electrical uses aforesaid and it is common practice heretofore to add aluminum or silicon to the steel after it has been tapped from the furnace into the ladle. In the case of aluminum killing the reaction is:

$$3FeO + 2Al \rightarrow Al_2O_3 + 3Fe$$

and in the case of silicon killed steel the reaction is:

$$2FeO + Si \rightarrow SiO_2 + 2Fe$$

The alumina or silicate inclusions in the steel thus formed are very detrimental to steel quality and result in poor surface quality and poor ductility.

Accordingly, it will be appreciated that any procedure which will lower the concentration of FeO in the steel as tapped from the furnace will also decrease the need for addition of killing metals, such as aluminum or silicon. From this, it is seen that the harmful inclusions formed by the deoxidizing operation will be present in lesser amounts.

It should therefore be obvious that to manufacture a desired type of steel, it is first necessary to create the desired type of slag for it is axiomatic in the steel industry that the slag is the father of the steel, and as the slag goes, so goes the steel.

A common charge in the open hearth furnace consists of 35 to 75% pig iron and the balance steel scrap, assuming the lime or limestone is already in place at the bottom of the furnace. When heat in the proper amount is applied to the charge, the pig iron and steel melt and the lime starts to rise through the bath and progressively combines with the early slag, as before mentioned, and ultimately dicalcium ferrite is formed. This common charge, however, produces only a minimal amount of tetra calcium alumino ferrite because of the very limited amount of alumina present in the materials forming the charge. Thus, a common charge may produce a bath having about 2% carbon.

What is known as the F/A ratio may be used to determine the proportion of tetra calcium alumino ferrite to dicalcium ferrite; for example, when the F/A ratio equals 1.57 or less, the tetra calcium alumino ferrite is at 100% and the dicalcium ferrite is 0%. By the F/A ratio is meant the ratio of the ferric oxide ($Fe_2O_3$ and represented by the letter F) to alumina ($Al_2O_3$ and represented by the letter A).

FIGURE 2 illustrates a table showing the molecular weights of various slag ingredients and the percentages of such ingredients in various slags. To secure the F/A ratio of any particular slag composition, it is necessary to divide the molecular weight of alumina into the molecular weight of ferric oxide present in such composition.

In a low carbon steel, with which we are primarily concerned, the F/A ratio in the slag is relatively high. As an example, for a 0.03%–0.06% carbon steel, the F/A ratio may be in the order of about 15. Although low carbon steel is desirable, the high F/A ratio is undesirable since it indicates a high percentage of dicalcium ferrite which, as before mentioned, causes the slag to contain a high percentage of ferrous oxide (FeO). And, as before pointed out, a high concentration of FeO in the slag also causes a high concentration of FeO in the steel because of the tendency to reach equilibrium of FeO between the slag and steel.

Referring to the table shown in FIGURE 2, with an F/A ratio of 15.68 (which indicates that the carbon content of the steel has been reduced to about 0.03% to 0.06%) the amount of alumina present in the slag is about 20%, and the amount of tetra calcium alumino ferrite (shown as C4AF) present is about 10%. Since tetra calcium alumino ferrite and dicalcium ferrite (shown as 2CF) are complementary minerals, the amount of the latter present is about 90%.

The molecular weight of ferric oxide is 160 and in a 10% concentration of C4AF, the weight of the ferric oxide is 16, whereas in a 90% concentration of 2CF, the weight of the ferric oxide is the difference between 160 and 16, which is 144.

Heretofore, when the desired carbon content was reached and the slag mature, the steel and slag were tapped into a ladle and either aluminum or silicon added to the ladle content to "kill" the steel, that is to reduce the FeO therein. Theoretically, and assuming 100% efficiency, one pound of aluminum will deoxidize four pounds of FeO, whereas one pound of silicon will deoxidize 5.1 pounds of FeO. Because of the high FeO content of this type of steel as tapped from the furnace it has been necessary to add to the ladle or molds as much as six pounds of aluminum per ton of steel tapped to deoxidize the steel, but the alumina or silicate inclusions thus formed, as above noted, impair the quality of the steel.

I have discovered that the amount of aluminum or silicon needed to be added, as aforesaid, may be drastically reduced, if not entirely eliminated, by controlling or limiting the formation and presence of FeO in both the slag and the metal (steel). This control is easily effected by controlling the formation of dicalcium ferrite in the slag which is the source of the FeO. Since dicalcium ferrite is composed of lime (CaO) and iron oxide ($Fe_2O_3$) and further since lime and iron oxide have a stronger affinity for alumina ($Al_2O_3$) than for each other, I have found it only necessary, after the desired carbon content of the steel has been reached and before tapping the melt from the furnace, to add additional alumina to the slag.

Addition of alumina to the slag just prior to tapping in proper amounts will change the dicalcium ferrite in the slag into tetra calcium alumino ferrite, thus causing the equilibrium balance for FeO between the slag and metal to be reversed. In other words, since the concentration of dicalcium ferrite in the slag is lowered, the FeO concentration in the metal will also be lowered, and practically all $Fe_2O_3$ will be in the tetra calcium alumino ferrite in the slag where it can do no harm.

Theoretically, it would be desirable to eliminate all dicalcium ferrite from the slag and thus eliminate all FeO in the slag and metal. This theoretical condition would eliminate the need to add aluminum or silicon to the ladle to "kill" the steel at tapping time when the heat is ready and the carbon content is right.

Again referring to the table shown in FIGURE 2, if enough alumina is added to the slag to bring the concentration of alumina in the slag from 0.2% to 2%, theoretically all of the dicalcium ferrite would be changed to tetra calcium alumino ferrite and all ferric oxide would be in or as the stable tetra calcium alumino ferrite phase. The F/A ratio would be brought down to 1.57, but lowering the F/A ratio would have no effect on the carbon content since the necessary amount of carbon has already been removed and nothing is thereafter added to increase carbon content.

As a matter of fact, an excess of alumina may be added to increase its concentration, to for example 2.4%, to insure that all dicalcium ferrite, even that which is formed by any lime which may still be rising in the bath, will immediately be transformed to stable tetra calcium alumino ferrite.

However, a limit would be reached where addition of further alumina would not have any appreciable effect and in the interest of economy, it would be practical to add only sufficient alumina to the slag before tapping from the furnace, to combine with substantially all of the $Fe_2O_3$ present and forming in the slag to form stable tetra calcium alumino ferrite.

The furnace content may thereafter be poured into a ladle and later into molds, and if desired as a matter of caution, a little, but materially lesser amount, of aluminum or silicon may be added to the ladle or mold. Since this lesser amount forms a minimum number of inclusions, the steel so formed is of superior quality.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:
1. In the manufacture of low carbon steel which is accompanied by a basic steel making slag containing a high concentration of dicalcium ferrite, the improvement comprising the steps of checking the slag just prior to the time the furnace is ready for tapping to establish the ferrous oxide content thereof, thereafter adding sufficient alumina to the slag to chemically combine with said dicalcium ferrite and lower the concentration of the latter to substantially zero, and then tapping the furnace.

2. In the manufacture of carbon steel which is accompanied by a basic steel-making slag in which dicalcium ferrite is present, the improvement comprising the step of adding alumina to the slag after the heat possesses the desired carbon content, alumina being added in an amount to chemically combine with said dicalcium ferrite and change substantially all of it to tetra calcium alumino ferrite wherein the iron oxide is maintained in inactive condition and thereby substantially non-reactive with the slag or the heat.

References Cited by the Examiner

UNITED STATES PATENTS

| Re. 23,778 | 2/1954 | Bowden | 75—54 |
| 2,283,622 | 5/1942 | Bowden | 75—54 |
| 2,593,554 | 4/1952 | Graf | 75—54 |
| 2,826,488 | 3/1958 | Bowden | 75—52 |
| 2,855,289 | 10/1958 | Bowden | 75—30 |

FOREIGN PATENTS

| 332,890 | 7/1929 | Great Britain. |

References Cited by the Applicant

UNITED STATES PATENTS

| 2,375,520 | 5/1945 | Bowden et al. |
| 2,480,901 | 9/1949 | Bowden et al. |
| 2,927,852 | 3/1960 | Bowden. |

BENJAMIN HENKIN, *Primary Examiner.*